United States Patent
Murdoch et al.

(10) Patent No.: US 12,149,614 B2
(45) Date of Patent: Nov. 19, 2024

(54) DEVICE ASSERTED VERIFIABLE CREDENTIAL

(71) Applicant: Microsoft Technology Licensing, LLC, Redmond, WA (US)

(72) Inventors: Brandon Murdoch, Reading (GB); Ankur Patel, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 202 days.

(21) Appl. No.: 17/997,513

(22) PCT Filed: Apr. 23, 2021

(86) PCT No.: PCT/US2021/028893
§ 371 (c)(1),
(2) Date: Oct. 28, 2022

(87) PCT Pub. No.: WO2021/222028
PCT Pub. Date: Nov. 4, 2021

(65) Prior Publication Data
US 2023/0179402 A1    Jun. 8, 2023

(30) Foreign Application Priority Data
Apr. 28, 2020   (LU) ........................................ 101754

(51) Int. Cl.
*H04L 9/08*    (2006.01)
*H04L 9/32*    (2006.01)

(52) U.S. Cl.
CPC .......... *H04L 9/0825* (2013.01); *H04L 9/0891* (2013.01); *H04L 9/3247* (2013.01)

(58) Field of Classification Search
CPC ... H04L 9/0825; H04L 9/0891; H04L 9/3247; H04L 63/0421; H04L 63/0823; H04L 63/123; G06F 21/73; G06F 21/44
See application file for complete search history.

(56) References Cited

U.S. PATENT DOCUMENTS

| | | | |
|---|---|---|---|
| 11,394,542 B2 * | 7/2022 | Murdoch | H04L 9/3239 |
| 2018/0285996 A1 * | 10/2018 | Ma | H04L 9/0637 |
| 2019/0073671 A1 | 3/2019 | Fang et al. | |
| 2019/0230073 A1 | 7/2019 | Patel et al. | |

(Continued)

OTHER PUBLICATIONS

Bartolomeu, et al., "Self-Sovereign Identity: Use-cases, Technologies, and Challenges for Industrial IoT", In Proceedings of 24th IEEE International Conference on Emerging Technologies and Factory Automation, Sep. 10, 2019, pp. 1173-1180.

(Continued)

*Primary Examiner* — El Hadji M Sall
(74) *Attorney, Agent, or Firm* — Workman Nydegger

(57) ABSTRACT

A computing system retrieves a value of a device identifier of itself and generates a device claim asserting the value of the device identifier. The device claim is then associated with an identifier of a user of the computing system. The computing system then generates and attach proof code to the device claim to turn the device claim into a verifiable device credential (VDC). The proof code proves that the VDC is issued by the user of the computing system. The VDC is later presented to a relying entity as part of an identity protection system to further protect the user's identity.

20 Claims, 13 Drawing Sheets

(56) References Cited

U.S. PATENT DOCUMENTS

| | | | | |
|---|---|---|---|---|
| 2019/0305964 A1* | 10/2019 | Hamel | .................. | H04L 9/0891 |
| 2019/0319939 A1* | 10/2019 | Hamel | .................... | G06F 21/33 |
| 2020/0036707 A1* | 1/2020 | Callahan | ................ | H04L 67/53 |
| 2021/0281421 A1* | 9/2021 | Semenovskiy | .... | G06Q 20/3276 |

OTHER PUBLICATIONS

"Search Report & Written Opinion issued in Luxembourg Patent Application No. LU101754", Mailed Date: Nov. 11, 2020, 8 Pages.
"International Search Report & Written Opinion issued in PCT Application No. PCT/US21/028893", Mailed Date: Sep. 16, 2021, 15 Pages.

* cited by examiner

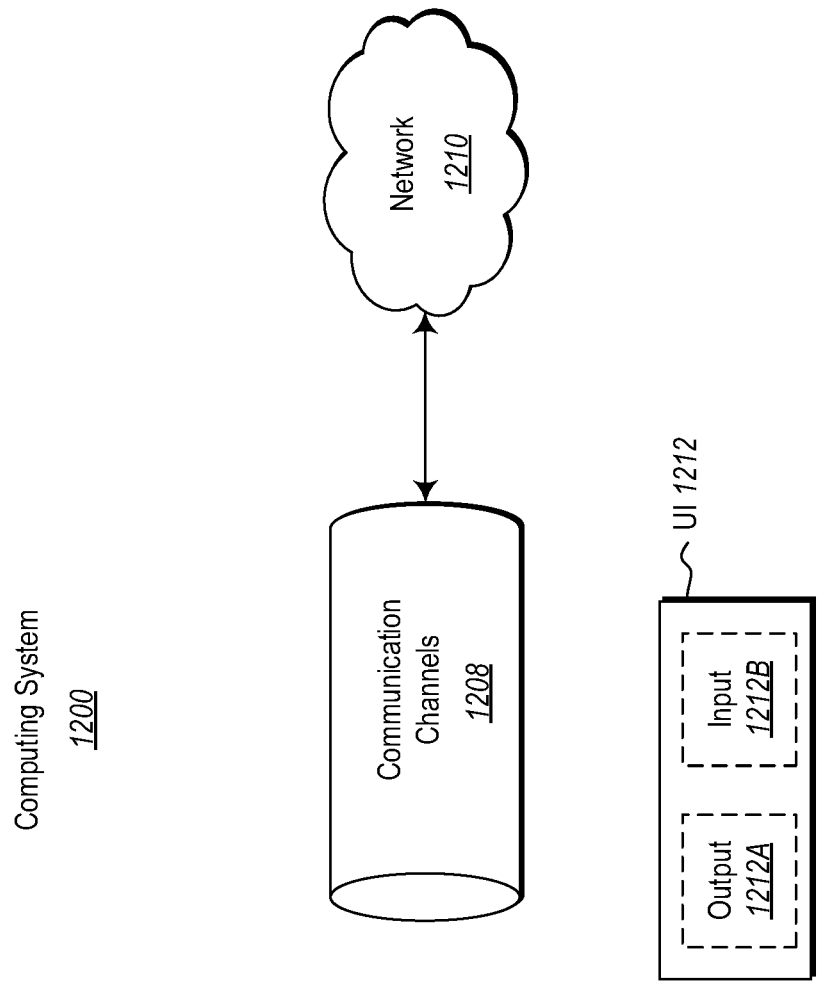

DEVICE ASSERTED VERIFIABLE CREDENTIAL

CROSS-REFERENCE TO RELATED APPLICATIONS

The present application is a U.S. National Stage of International Application No. PCT/US2021/028893, filed on Apr. 23, 2021, designating the United States, and claiming the priority of Luxembourg Patent Application No. LU101754 filed with the Luxembourg Intellectual Property Office on Apr. 28, 2020. All of the aforementioned applications are incorporated herein in their respective entireties by this reference.

BACKGROUND

A digital identity is a mechanism to keep track of an entity across different digital contexts. After an identity is determined, appropriate action can be taken related to the entity that has the identity. As an example, authorizations, privileges, customizations and access can be provided to the entity. Thus, digital identities are an important mechanism to ensure that information is restricted to appropriate trust boundaries via appropriate containment of authorizations and privileges. Digital identities are also an important mechanism to ensure a positive and consistent user experience when accessing their data and customizations.

Most currently used documents or records that prove identity are issued by centralized organizations, such as governments, corporations, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. When a party needs to verify another party's identity, the verifying party often needs to go through the centralized identity management system to obtain information verifying and/or authenticating the other party's identity.

Decentralized Identifiers (DIDs) are a more recent type of identifier. Decentralized identifiers are independent of any centralized registry, identity provider, or certificate authority. Distributed ledger technology (such as blockchain) provides the opportunity for using fully decentralized identifiers. Distributed ledger technology uses distributed ledgers to record transactions between two or more parties in a verifiable way. Once a transaction is recorded, the data in the section of ledger cannot be altered retroactively without the alteration of all subsequent sections of ledger. This provides a fairly secure platform in which it is difficult or impossible to tamper with data recorded in the distributed ledger. Since a DID is generally not controlled by a centralized management system, but rather is owned by an owner of the DID, DIDs are sometimes referred to as identities without authority.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Existing computing technologies provide for a data structure called a "verifiable credential" (hereinafter also called a "VC"). In these technologies, a credential issuer makes one or more claims about a subject entity, and generates a VC. The VC includes those claim(s) as well as a proof (e.g., cryptographic signature or code) to prove that claim(s) have not been tampered with and were indeed issued by the credential issuer. Thus, the proof is also called proof code. The credential issuer then provides the VC to a credential holder, for presentation to any relying party that relies upon the veracity of those claims. When the subject entity is a person, the subject entity and the credential holder are often the same entity. When the subject entity is not a person (e.g., a device, a pet), the credential holder may be the owner of the subject entity.

As an example, the claims issuer might be a computing system associated with a government agency in charge of issuing driver licenses. The government agency may generate a VC with claims about a citizen, such as the date of birth, residence address, weight, eye color, hair color, authorization to drive, restrictions on authorization to drive, and so forth. The government agency issues the VC to the citizen, just like issuing a physical driver license. The user stores the VC in a computing system (e.g., a mobile phone) or in a cloud storage that the user's computing system has access to. A VC that is used to assert claims about a user is also called a "user VC."

If the user is to rent a car from a car rental company, the user may present the user VC, whereby a computing system associated with the rental car company may use the proof code to verify that the claims include authorization to drive, and were issued by the government agency and indeed have not been tampered with since issuance.

However, like a physical identity card (e.g. a physical driver license card), when such a user VC is presented to a computing system of a relying entity, even though the computing system of the relying entity can use the proof code to verify that the VC was issued by a credential issuer about a subject entity, there is no proof that the person and/or the device presenting the VC is associated with the subject entity. For example, if a second user obtains a VC of a first user, the second user may present the VC of the first user as his/her own identifier. The principles described herein mitigate this problem by associating a unique identifier of a device with an identifier of a user or a user VC. Since each device has its own unique identifier, and many devices belong to a single user, the device identifier can be associated with a user identifier or a user VC as part of an identity protection system, therefore, to enhance the security of user transactions.

The embodiments described herein are related to a computing system that is configured to issue a claim that includes a unique device identifier of the device, such as an International Mobile Equipment Identity (IMEI), a media access control (MAC) address, etc. Since such a claim is related to a property of a device, not a user, this type of claim is also called "device claim." The computing system then generates and attaches a proof to the device claim to generate a verifiable device credential (hereinafter also called a VDC). The VDC can then be associated with a user's identifier or a user VC. Various embodiments can be implemented to associating a VDC with a user's identifier or a user VC, including, but not limited to, (1) signing the device claim with a private key associated with a user, (2) associating the VDC with a user VC by computing systems of relying entities, and/or (3) incorporating the VDC into a user VC by computing systems of credential issuers.

In some embodiments, the proof includes a signature signed by the user's private key, such that a relying entity can decrypt the signature using the user's public key to verify that the VDC was indeed issued by the user using the user's private key. In a decentralized environment, when the user is an owner of a decentralized identifier (DID), the VDC is signed by a private key of the DID, and a portion of data associated with the VDC is propagated onto a DID document or a distributed ledger. The relying entity can further verify the VDC using the data propagated onto the DID document or the distributed ledger.

In some embodiments, the VDC also contains metadata indicating one or more revocation mechanisms of the VDC. The revocation mechanisms allow users to revoke the previously issued VDC. For example, when the device is misplaced or stolen, the user can revoke the VDC. As another example, an expiration time is included as one of the revocation mechanisms. In such a case, a VDC must be renewed periodically, or a new VDC must be generated after the expiration of an existing VDC. As such, the security of the device is further improved.

In some situations, the VDC alone is sufficient to serve as proof of a user's identity. For example, when a user tries to subscribe to a device-based service, such as mobile wireless service, streaming service, etc., the service provider does not need to know personally identifiable information of the user; instead, the service provider only needs to know that the user has control over the device, which is proven by the VDC. Thus, in such a case, the device identifier alone is sufficient for the service provider to provide the service to the user, and the user's privacy and personally identifiable information are further protected.

In some embodiments, additional self-issued claims are also incorporated into the VDC. The users can use the additional self-issued claims to self-identify himself or herself. This is useful in situations where verification of formal identity is not required, such as casual online communications, signing up for social media accounts, etc. For example, when a user signs up for a social media account, he or she often needs to provide a name or a screen name. Such a name may be the user's real name or an alias, and no third-party verification is required. The user can issue a self-issued claim asserting his or her name, and incorporate the self-issued claim into the device claim.

In some embodiments, the above described mechanisms are implemented mutually between devices of any two entities. For example, when two devices or computing systems (including computing systems of credential holders, relying entity and credential issuers) are communicating with each other, the two devices exchange their VDCs in addition to other entity information (e.g., other self-issued VC or VC issued by other credential issuers).

In addition to issuing VDCs and presenting a VDC with a VC by devices of a credential holder, in some embodiments, computing systems of relying entities are configured to further associate the received VDCs with the corresponding VCs. For example, when a first computing system of a relying entity receives the VDC from a second computing system of a credential holder, the device identifier of the second computing system contained in the VDC is recorded in a communication log. When the first computing system receives a new communication request from the same second entity, the device identifier of the new communication request is compared with the device identifier in the recorded communication log. When the newly received device identifier does not match any existing device identifiers recorded in the communication log, an alert is generated, or additional verification is required. When the newly received device identifier is found in the communication log, the first computing system would understand that the entity has used the same device in the past, thus the communication is likely to be legitimate.

Alternatively, or in addition, computing systems of credential issuers are also configured to associate VDCs with VCs. In some cases, a computing system of a credential issuer is configured to incorporate device claims into VCs, such that only the incorporated devices are allowed to present the corresponding VCs. For example, a VDC of a credential holder is sent to a credential issuer that is configured to issue user VCs. The credential issuer is caused to incorporate the device claim into the user VC. For example, a user of a driver license uses his/her phone to generate a VDC, and sends the VDC to the DMV. The DMV will perform various verifications to make sure that the device is truly the user's device. After the verification, the DMV adds the device claim into the user's driver license VC, such that only the device(s) contained in the driver license VC is allowed to present the driver license VC to a relying entity.

After the device claim is included in the user VC, the VDC and the VC can then be presented to a computing system of a relying entity. Receiving the VDC and the VC, the computing system of the relying entity extracts the device identifier contained in the VDC and the device identifier contained in the VC, and compare the two device identifiers to determine whether they match. In response to a determination of match, the computing system of the relying entity determines that the device is an authorized device for presenting the user VC. The computing system of the relying entity then sends the determination to the device of the credential holder. As such, only the authorized devices are allowed to present a user VC to a computing system of a relying entity.

Similarly, when a device requests the credential issuer to update a user claim contained in a user VC, the device also sends the VDC to the credential issuer. The computing system of the credential issuer extracts the device identifier contained in the VDC and the device identifier contained in the user VC and compares the two device identifiers to determine whether the two device identifiers match. In response to a determination of match, the credential issuer updates the user claim based on the user's request; otherwise, the request is denied. As such, unauthorized devices cannot validate or make changes to an existing user VC.

Accordingly, the principles described herein allow a user's device to assert a self-issued VDC containing the unique device identifier, which is, in turn, used as proof of user's identification, and/or as part of an identity protection system, such that the user's identity is further protected, and the user transactions are also further secured.

Finally, another problem of the traditional VCs is that they are not easily understood by the general users because such VCs are often recorded in a code format, such as the JSON Web Token (JWT) format. The embodiments described herein solve this problem by transforming the code of the VDC into a personal identity card. The personal identity card is a data structure that not only includes the data contained in the VDC, but also includes additional metadata (e.g., an image of the device, usage data, presentation format, etc.). The personal identity card is then presented to a user as one or more visualizations that resemble a physical identity card. The visualizations also allow users to easily modify the VDC and/or interact with relying entities. For example, a visualization of the personal identity card may allow the user to revoke or renew a VDC or send the VDC to a particular relying entity.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 12 illustrates an example computing system in which the principles described herein may be employed.

DETAILED DESCRIPTION

The principles described herein are related to issuing a verifiable device credential (VDC) asserting a value of a unique device identifier (herein after also called device identifier). The embodiments are likely implemented in a computing system that is owned and used by a limited number of users, such as a mobile device, a home computer. The computing system is configured to retrieve a value of a device identifier of itself and generates a claim asserting the value of the device identifier.

A claim is often expressed using a property-value pair. FIG. 1A illustrates an example data structure that represents a claim 100A. The claim 100A includes a subject 111A, a property 112A, and a value 113A. For example, the subject 111A includes an identifier of the subject entity (e.g., a decentralized identifier (DID)). The property 112A may be any property of the subject of the DID, such as a name, an address, a date of birth, etc. The value 113A is the value of the corresponding property 112A. For example, when the property 112A is a "name", the value 113A would be the name of the subject entity 111A, e.g., John Doe. When the property is an "address", the value 113A would be the address of the subject entity 111A, e.g., 123 Main St., City, State, Zipcode. A claim that asserts a value of a property of a user is called a user claim.

Here, since the claim issued by the computing system asserts a value of a device property (e.g., a device identifier), such a claim is called a device claim. For example, the device claim may assert a value of IMEI of a mobile phone. In such a case, the property of the claim would be IMEI, and the value of the claim would be the IMEI number (e.g., 1234-5678-0000-000).

Thereafter, the computing system associates the device claim with a user of the computing system. In particular, the computing system generates a proof (e.g., proof code) which proves that the claim is issued on the user's behalf. The proof is then attached to the device claim to generate a verifiable device credential (VDC). In many cases, the proof is a signature of the device claim that is signed by the user's private key. When a relying entity receives the VDC, the relying entity is caused to decrypt the signature using the user's public key to verify the decrypted proof code is consistent with the asserted value of the device claim.

Figure 1B:
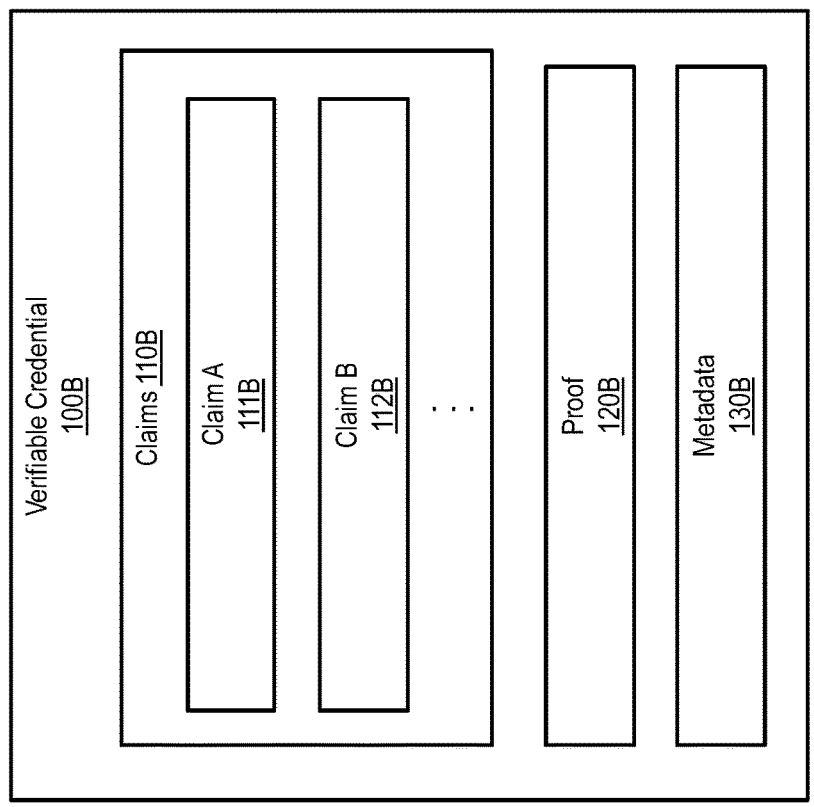
FIG. 1B illustrates an example data structure of a verifiable credential (VC)
Figure 1A:
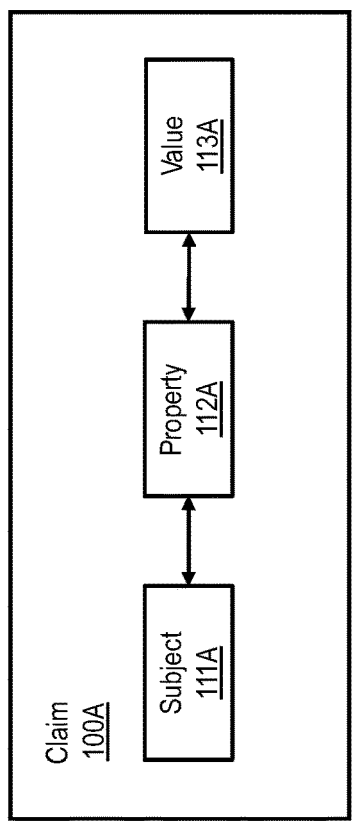
FIG. 1A illustrates an example data structure of a claim.

FIG. 1B illustrates an example VC 100B. The VC 100B includes one or more claims 110B (e.g., claims 111B, 112B), and proof code 120B. The proof code 120B often includes a cryptographic signature that is signed by a private key of the claim issuer. When a relying entity receives the VC 100B, the relying entity can retrieve a public key of the claim issuer and decrypt the cryptographic signature, and compare the decrypted signature with the data contained in the claims 110B to verify at least that (1) the VC was indeed issued by the claim issuer, (2) the claims contained in the VC have not been tempered. In some embodiments, the VC also includes various metadata 130B, which is data related to the VC 100B. For example, the metadata 130B may include (1) a unique identifier identifying the corresponding VC 100B, (2) one or more conditions for accessing the VC 100B, and/or (3) one or more revocation mechanisms for revoking the corresponding VC 100B.

When a VC holder interacts with a relying entity, the VC holder can present or send the VC to the relying entity via various channels, including but are not limited to wide area network (WAN), local area network (LAN), Bluetooth (BLE), near field communication (NFC), 2G/3G/4G/5G mobile communication networks, SMS, a scan of a bar code or QR code. When the relying entity receives the VC 100B, the relying entity can use the proof code 120B to authenticate the claims 110B contained in the VC.

Figure 2:
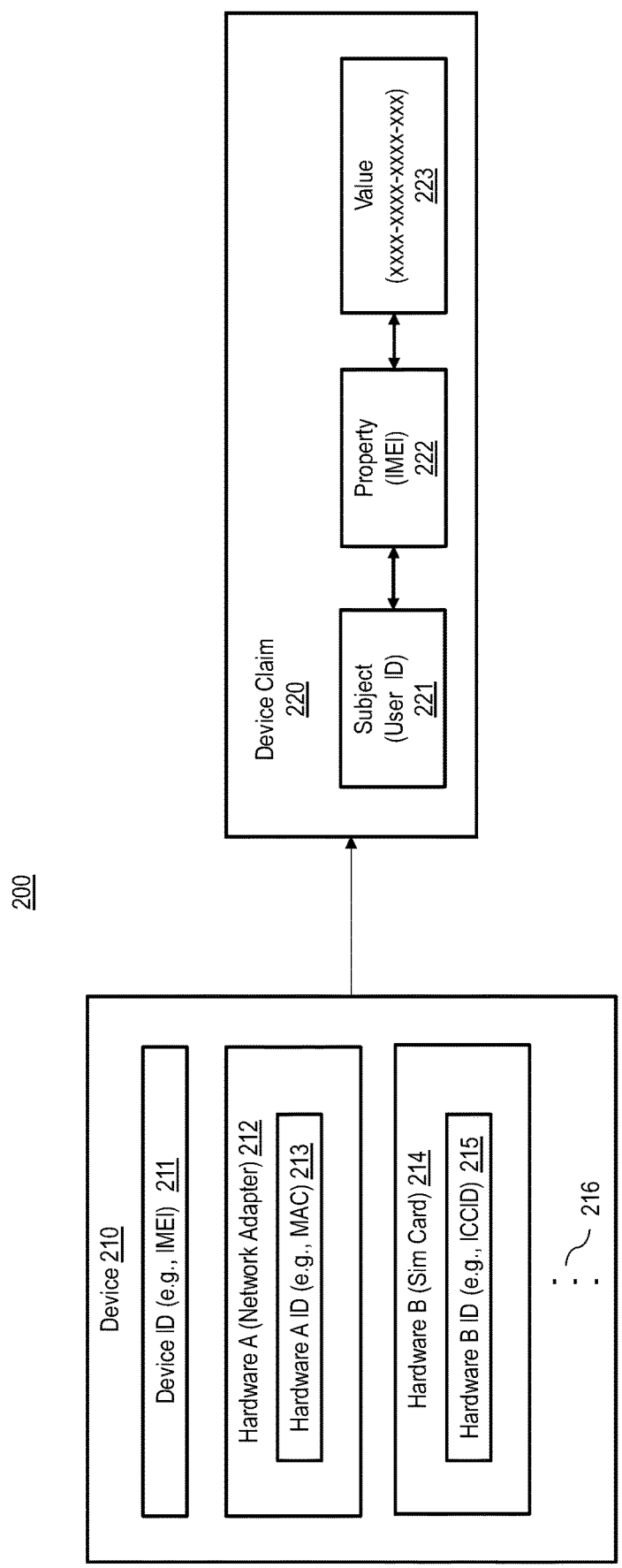
FIG. 2 illustrates an example embodiment of that a device is configured to issue a device claim asserting a value of a device identifier.

FIG. 2 illustrates an example embodiment 200 of that a device 210 is configured to assert a device claim 220. The device 210 is a computing system, such as a mobile device. As illustrated in FIG. 2, the device 210 is associated with various device identifiers 211, 213, 215, each of which is a unique identifier associated with the device 210, or a hardware component 212, 214 of the device 210. Some device identifiers are associated with the device 210, such as IMEI 211. Some device identifiers are associated with a hardware component 212, 214 of the device. For example, a MAC address 213 is associated with a network adapter 212 of the device 210, and an integrated circuit card identifier (ICCID) is associated with a subscriber identity module (SIM) card 214 of the device 210. The ellipsis 216 represents that there may be any number of device identifiers associated with the device 210 or components of the device 210, and each of these device identifiers may be included in a device claim or a VDC. These device identifiers 211, 213, 215 are often hard programmed into the device 210 or components 212, 214 upon manufacture, thus, each of these device identifiers 211, 213, and/or 215 can be used to identify the device 210. Since many devices belong to a single user or a small group of users (family members), the device can also be used to identify the user or the group of users.

The device 210 retrieves a value of at least one of the device identifiers 211, 213, 215, and generates a device claim 220 asserting the value of the at least one device identifier and associating the device claim with a user of the device. As illustrated in FIG. 2, the device claim 220 includes a property-value pair 222, 223 of IMEI. The subject of the device claim is an identifier (ID) of the user 221. In a decentralized environment, the user ID 221 may be a DID of the user. The device claim 220 is merely an example device claim. In some cases, the device has its own DID. In such a case, the subject entity of the device claim may be the DID of the device.

As described above, each device often has multiple unique device identifiers. Additionally, each user also often has multiple identifiers (DIDs) for various purposes. Thus, the device 210 is capable of issuing multiple device claims associating different user identifiers into each of the claims or asserting values of different device identifiers for different purposes. For example, when the user uses the device to subscribe a wireless service, the value of MEI 211 is asserted in a device claim; when the user uses the device to subscribe a streaming service, the value of MAC address is asserted in a device claim; and when additional security is required, values of multiple device identifiers may be asserted.

As briefly described above, after the device claim is generated, the computing system further generates and attaches a proof to the device claim to make it into a VC. The proof is often a cryptographic signature, signed by a private key of a user. Since the VC is signed by the user and presented by the user, such a VC is also called self-issued VC. For brevity, without further specification, all the VDCs described herein are self-issued VCs.

Figure 3:
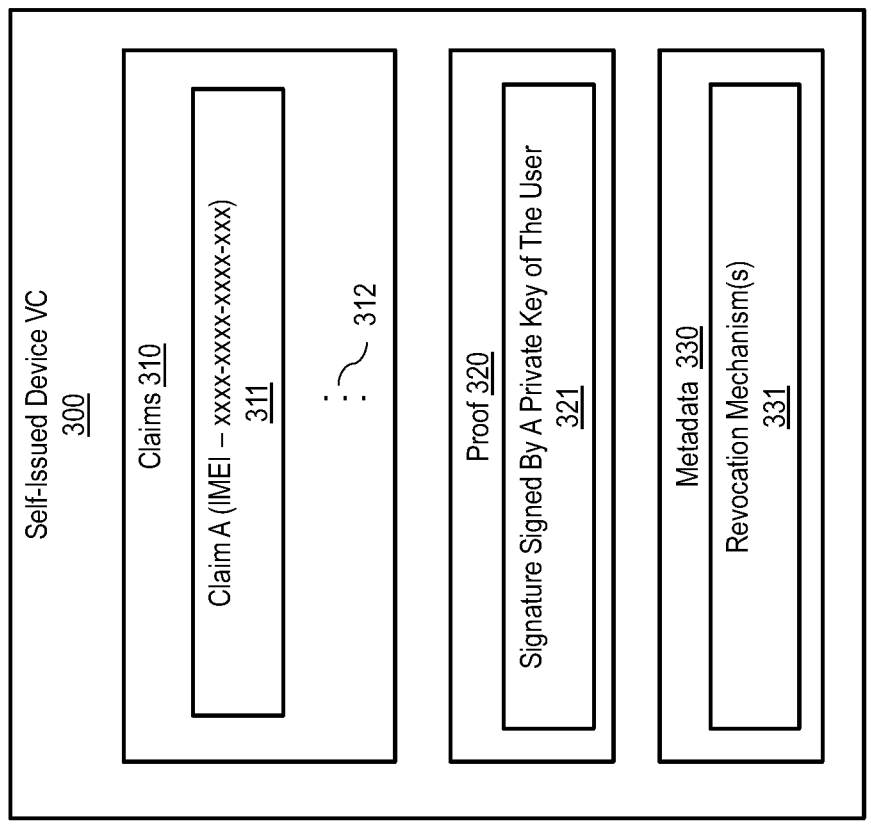
FIG. 3 illustrates an example data structure of a self-issued VDC.

FIG. 3 illustrates an example self-issued VDC 300. The self-issued VDC 300 includes one or more device claims 310, including a claim 311 asserting a value of IMEI of the device. The ellipsis 312 represents that there may be any number of device claims contained in the VDC 300. The additional claims may contain information related to the user (e.g., a username) or information related to additional device identifiers. The VDC 300 also includes a proof 320 and metadata 330. The proof 320 includes a signature 321 signed by a private key of the user, who is also the holder of the VDC 300. The metadata 330 includes one or more revocation mechanism(s) of the VDC 331. In some embodiments, the one or more revocation mechanism(s) includes an expiration time of the VDC 300, and the VDC 300 is required to be renewed periodically or be reissued upon expiration. The expiration time is especially helpful when a user misplaces and/or forgets about a device that has issued a VDC associated with the user. Even if the user forgot about the device, the VDC will expire automatically, and no one can use the device to perform transactions on behalf of the user upon the expiration of the VDC.

Figure 4:
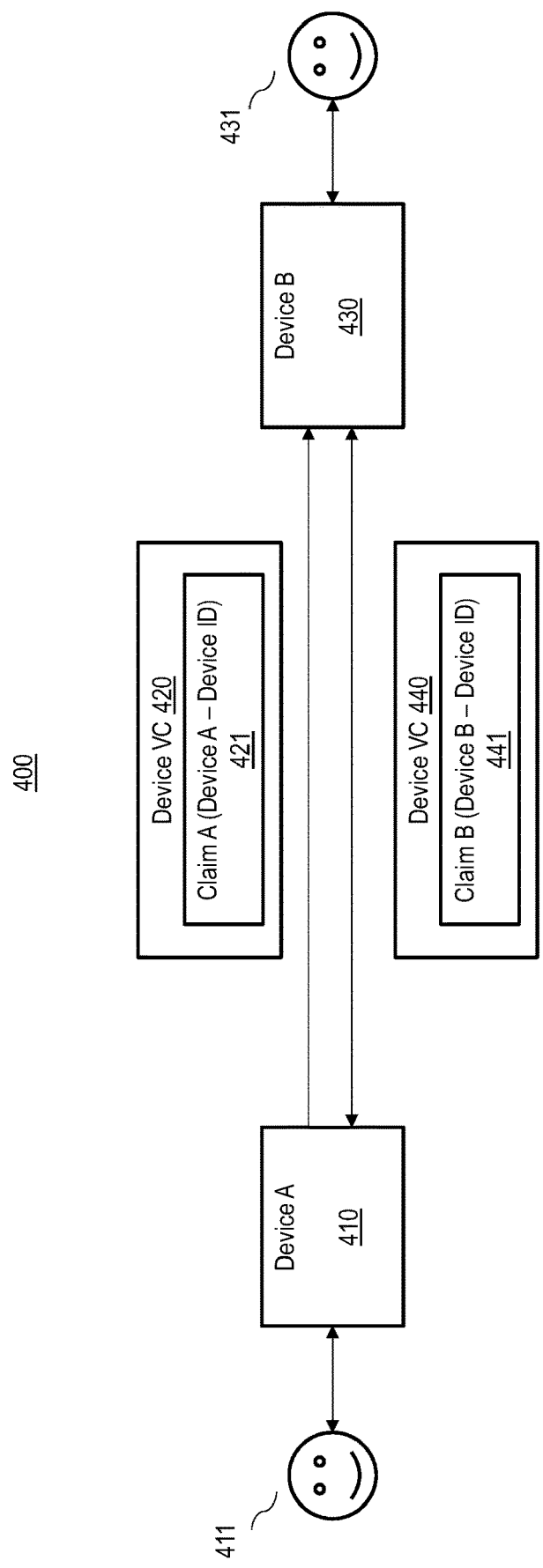
FIG. 4 illustrates an example communication session between two users' devices, during which the two devices exchange their self-issued VDCs as part of self-identification.

FIG. 4 illustrates an example communication session 400, in which two user devices 410, 430 mutually present their self-issued VDC 420, 440 to each other. Device A 410 belongs to user 411. Device A 410 retrieves its own device identifier and generates a device claim A 421 and uses the user 411's private key to generate a signature of the device claim A 421. The signature is attached to the device claim A 421 to turn it into a VDC 420. The VDC 420 is then sent to device B 430. Subsequently, or substantially simultaneously, device B 430 also retrieves its own device identifier and generates a device claim B 441. Similarly, device B 430 signs the device claim B 441 using the user 431's private key to generate a VDC 440. The VDC 440 is then sent to device A 410. Each of device A 410 and device B 430 verifies that the VDC 420, 440 is indeed issued by the other device.

In some cases, each of device A 410 or device B 430 records the communication session in a log. The log includes the device identifier and user identifier of each party. In some embodiments, incoming communications are analyzed based on the previously recorded log to detect potential fraud. In a decentralized environment, certain data related to the communications or transactions is propagated onto a distributed ledger. Thus, the entities can also use the data propagated onto the distributed ledger to further validate whether the device has been previously used by the same user in the past transactions.

For example, when user 411 bought a new phone, he/she will start to use the new phone to communicate with user 431. When the new phone is used, the new phone will generate a VDC using its device identifier. Receiving the VDC of the new phone, device B 430 will determine that the new phone's identifier is different from any device identifiers of user 411 recorded in the previous communication sessions. In such a case, device B 430 may request the user 411 to provide additional user information to prove that the new device is truly the user 411's device.

For example, in some cases, device B 430 may require the user 411 to further authenticate himself/herself using various biometrics (e.g., fingerprint, iris scan, facial recognition, etc.). Alternatively, or in addition, device B 430 may send an email or text message, and/or call the user's phone number to have the user 411 to authenticate via a second communication channel. As another example, device B 430 may require the user 411 to further present a self-issued VC that includes additional personal data of the user 411 (e.g., date of birth, answer of a secret question, etc.). Alternatively, or in addition, device B 430 may require the user 411 to provide a VC (e.g., a driver license VC) that is issued by a neutral credential issuer or an identity provider. As such, self-issued VDCs can be presented amongst parties to provide additional protection to users' identities.

Figure 5A:
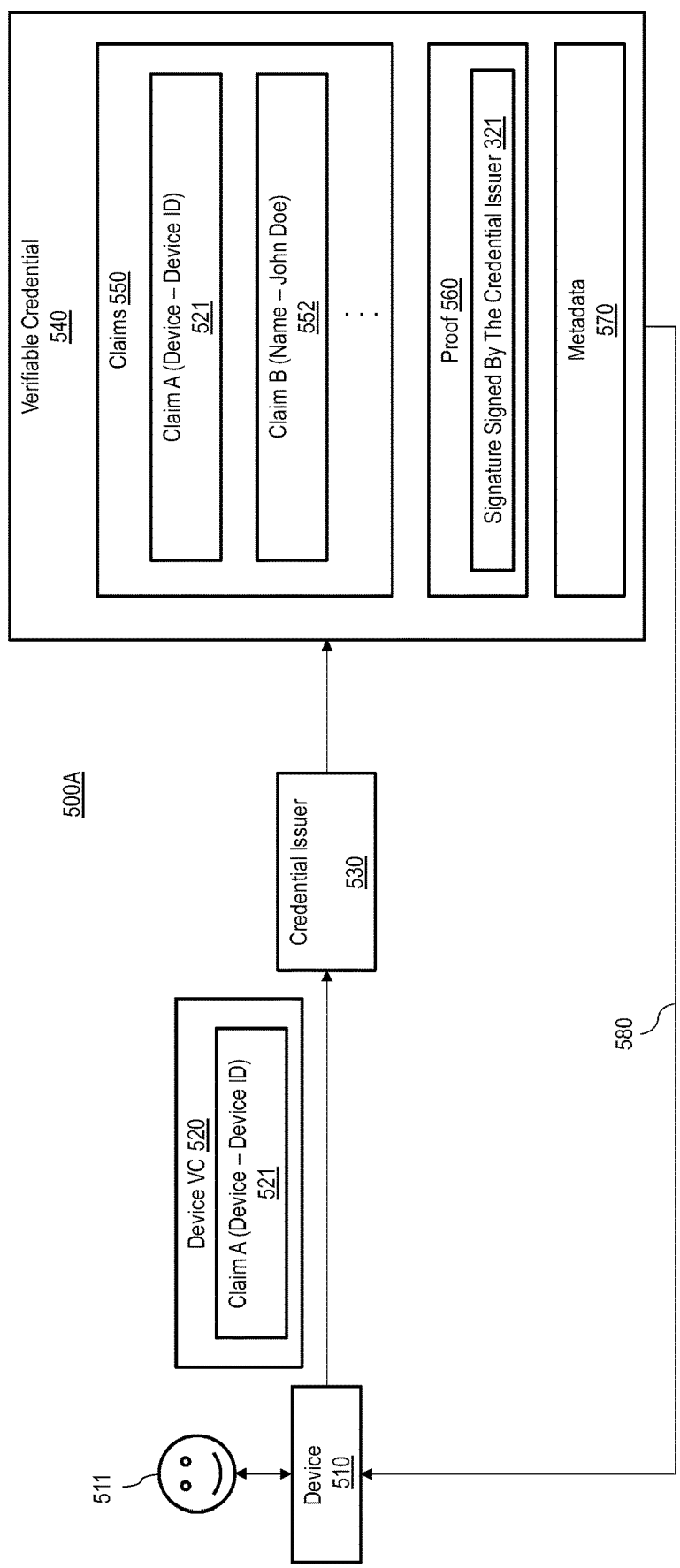
FIG. 5A illustrates an example embodiment of that a user's device sends a VDC to a credential issuer, causing the credential issuer to issue a VC containing the device claim.

In addition to use the self-issued VDCs in direct communications, a user can also request other credential issuers to incorporate the device claims into user VCs. FIG. 5A illustrates an example environment 500A, in which a credential holder 511's device 510 requests a credential issuer 530 to issue or update a VC issued to the credential holder to include a device claim 521. As illustrated in FIG. 5A, the credential holder 511's device 510 generates a self-issued VDC 520 including a device claim A 521. The device 510 sends the VDC 520 to the credential issuer 530. For example, the credential issuer 530 may be the DMV, which has issued a driver license VC to the credential holder 511. Receiving the VDC 520 from the credential holder 511's device 510, the credential issuer 530 updates the existing driver license VC 540 issued to the credential holder 511, or issues a new driver license VC 540 to include the device claim 521 in the driver license VC 540.

As discussed earlier, a VC may include multiple claims. For example, a driver license VC would include multiple claims about a driver, such as the legal name, the date of birth, residence address, weight, eye color, hair color, authorization to drive, restrictions on authorization to drive, and so forth. The principles described herein allows the users to request credential issuers to include one or more device claims into new VCs or existing VCs issued by a credential issuer. As illustrated in FIG. 5A, the credential issuer 530 issues or updates a VC 540 of the credential holder 511 to include the device claim 521. As such, the VC 540 not only includes the claims about the credential holder 511 (e.g., claim B 522 asserting the name of the credential holder 511), but also includes the device claim 521.

In many cases, a same user may have multiple devices. Each of these devices can similarly generate a VDC and have the credential issuer 530 to incorporate its device claim into the verifiable credential 540. As such, the verifiable credential 540 may include multiple device claims corresponding to multiple user devices.

Each time, a new device claim is added to the claim set 550, a new proof 560 is generated. The new proof 560 is attached to the new claim set 550 to make the new claim set 550 to be verifiable. In many cases, the new claim set 550 is signed by a private key of the credential issuer 530 to generate a signature 321, and the signature 321 is then attached to the claim set 550 as the proof 560. The VC 540 may also include various metadata 570, which is data related to the VC 540, such as a unique identifier identifying the VC 540, one or more revocation mechanism(s), etc. The updated or newly issued VC 540 is then sent back to the device 510, which is represented by arrow 580. The credential holder 511 can then present the VC 540 and the self-issued VDC 520 to other relying entities.

Figure 5B:
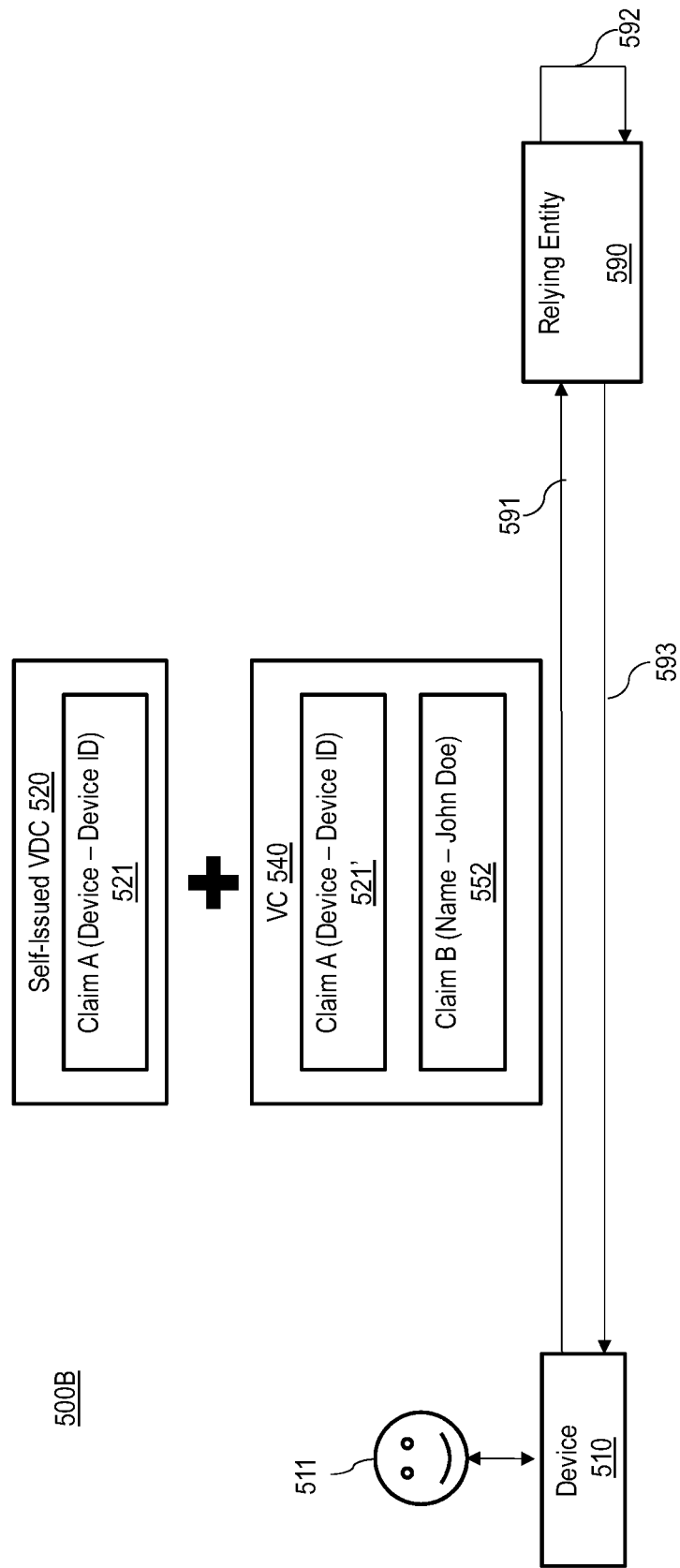
FIG. 5B illustrates an example embodiment of that the user's device sends both a self-issued VDC and a VC issued by a credential issuer to a relying entity.

FIG. 5B illustrates an example environment 500B, in which the credential holder 511's device 510 sends the self-issued VDC 520 and the user VC 540 (issued by the credential issuer 530) to a relying entity 590, which is represented by arrow 591. Receiving both the VDC 520 and user VC 540, the relying entity 590 extracts the device identifier contained in the VDC 520 and the device identifier contained in the VC 540. The relying entity 590 then compares the extracted device identifiers to determine whether the two extracted device identifiers match, which is represented by arrow 592. The determination is then sent back to the device 510, which is represented by arrow 593.

Only when the device identifiers in the two device claims 521 and 521' match, the relying entity will further consider the user claim B 552 contained in the VC 540. As such, the user not only must possess a copy of the VC 540, but also need to present the VC 540 using one of the devices that have been registered with the relying entity 590 (i.e., contained in the VC). When another user obtains a copy of the VC 540, the user using a different device cannot present the VC 540 as his/her own identifier. Thus, the user's identity is further protected.

Further, as briefly described above, VCs are often recorded in a code format, such as the JSON Web Token (JWT) format, which can be easily understood by computing systems, but not by the general public. The embodiments described herein solve this problem by transforming the code of a traditional verifiable claim into a personal identity card. The personal identity card is a data structure that not only includes the data contained in the VC, but also includes additional metadata (e.g., a photo of the user, an image of the device, usage data, presentation format, etc.). The personal identity card is then presented to a user as one or more visualizations. At least one of the visualizations resembles a physical identity card. The presentation may be performed by a mobile app, a web browser, and/or a web application. In a decentralized environment, the mobile app may be a part of a user's DID management module (e.g., a wallet app).

Figure 6:
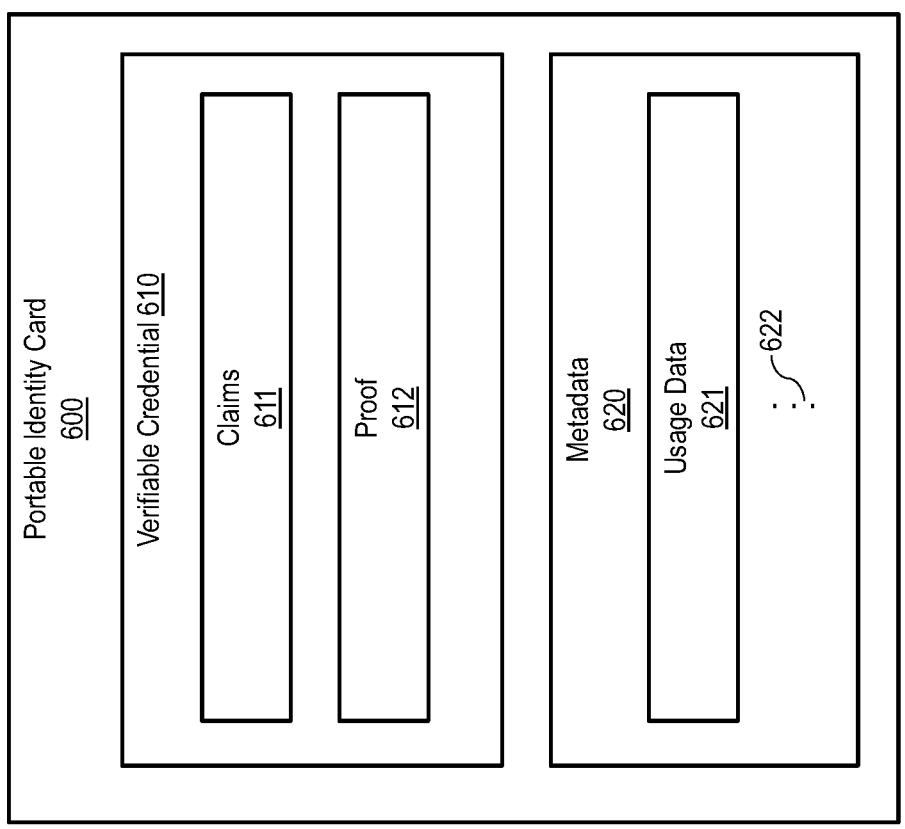
FIG. 6 illustrates an example data structure of a portable identity card.

FIG. 6 illustrates an example data structure 600 of portable identity card. The data structure 600 includes a verifiable credential 610 containing at least one or more claims 611 and proof code 612. The data structure 600 also includes metadata 620. The metadata 620 includes usage data 621. Ellipsis 622 represents that there may be additional metadata contained in the portable identity card 600, including but are not limited to, a logo of the claim issuer, an image of the device, presentation format, etc.

Figure 7B:
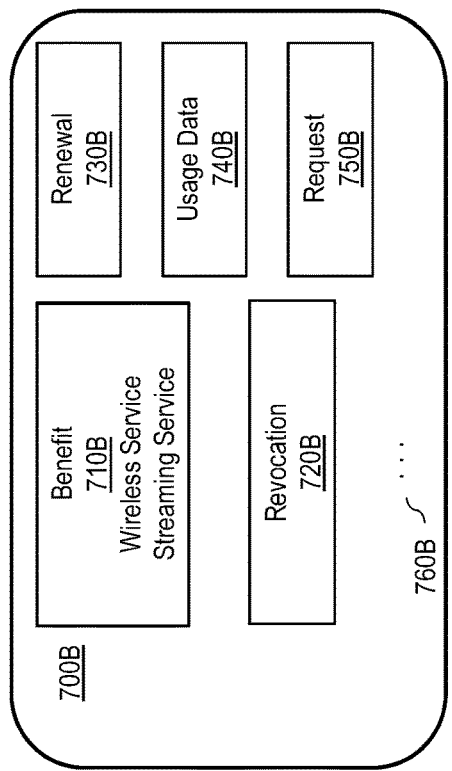
FIGS. 7A and 7B illustrate two example visualizations of portable identity card.
Figure 7A:
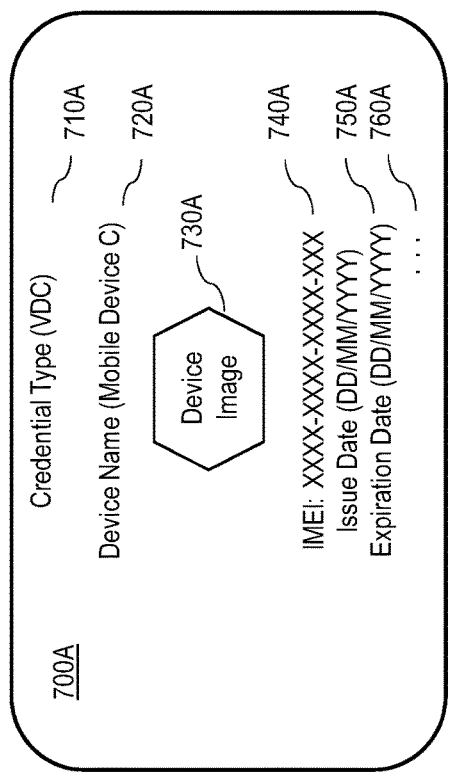

As described above, a VDC is a special type of VC that is issued by the subject entity. Either a VDC or a VC issued can be stored in the data structure of a personal identity card and presented as one or more visualizations. FIGS. 7A and 7B illustrate various example visualizations 700A and 700B of a portable identity card that may be presented to a user. As illustrated in FIG. 7A, the visualization 700A resembles a front side of a physical identity card. The visualization 700A includes the credential type 710A, which indicates the type of the VC. Here, the credential type is VDC. The visualization 700A also includes data related to the VC, such as the device name 720A, a device image 730A, the IMEI value of the device 740A, the VC's issue date 750A, and expiration data 750A. The ellipsis 760A represents that there may be additional or different data presented on the visualization 700A.

FIG. 7B illustrates another example visualization 700B, through which users can review additional metadata associated with the VC. Users are also allowed to interact with various user interfaces contained in the visualization 700B to perform different actions. For example, the visualization 700B includes a benefit section 710B, which lists one or more benefits that are associated with the device, such as wireless service, streaming service, etc. The visualization 700B also includes a revocation interface 720B and a renewal interface 730B. A user can interact with the revocation interface 720B to revoke the VDC or interact with the renewal interface 730B to renew the VDC. The visualization 700B also includes a usage data section 740B, through which the user can see data associated with the use of the VDC. For example, the user may be able to see a log including all the entities, to which the device has presented the VDC. The visualization 700B also includes a request interface 750B, through which the user can send the VDC to a particular relying entity or a credential issuer. The ellipsis 760B represents that there may be additional or different user interface or sub-visualizations contained in the visualization 700B

The visualizations 700A and 700B shown in FIGS. 7A and 7B are merely schematic examples. Various arrangements and contents may be implemented to achieve the same, similar, or additional functions. In some embodiments, users may be allowed to design or customize the visualizations of each personal identity card.

Figure 8:
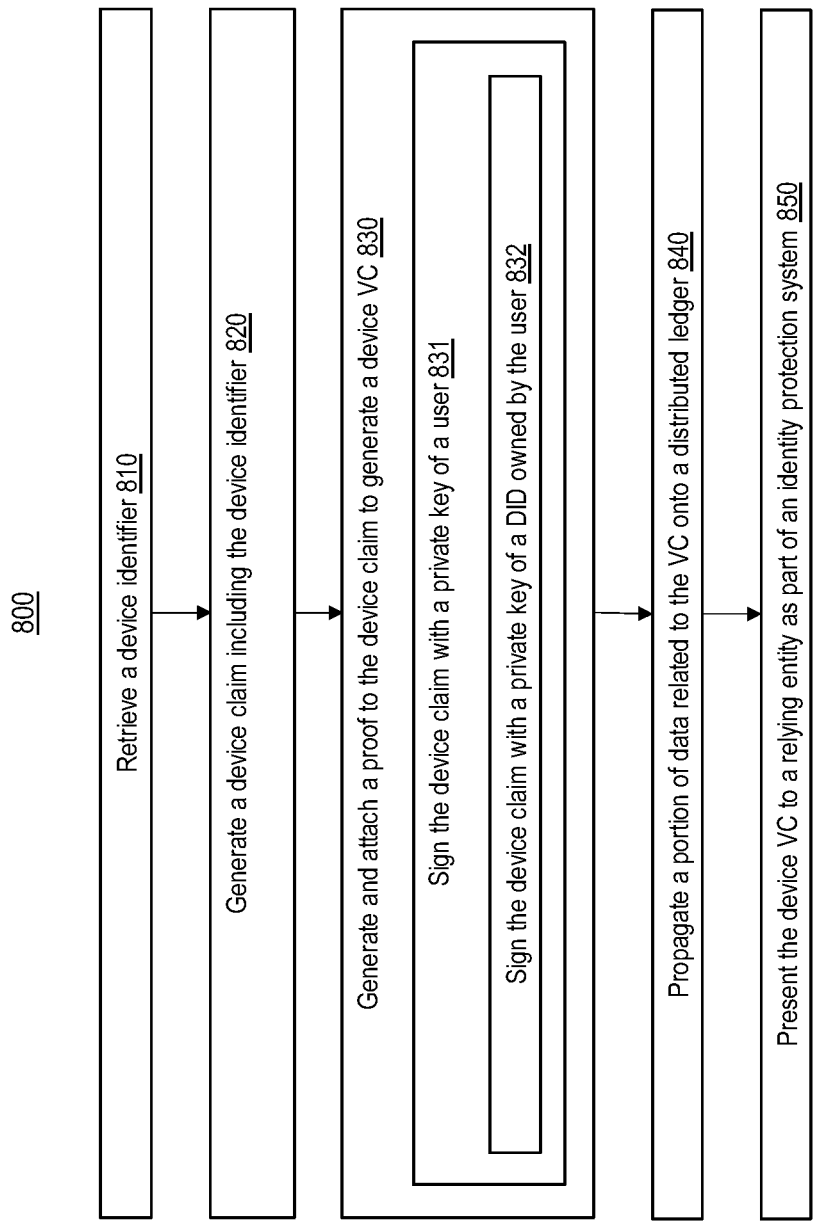
FIG. 8 illustrates a flowchart of an example method for generating and presenting a VDC to a relying entity as part of an identity protection system.
Figure 9:
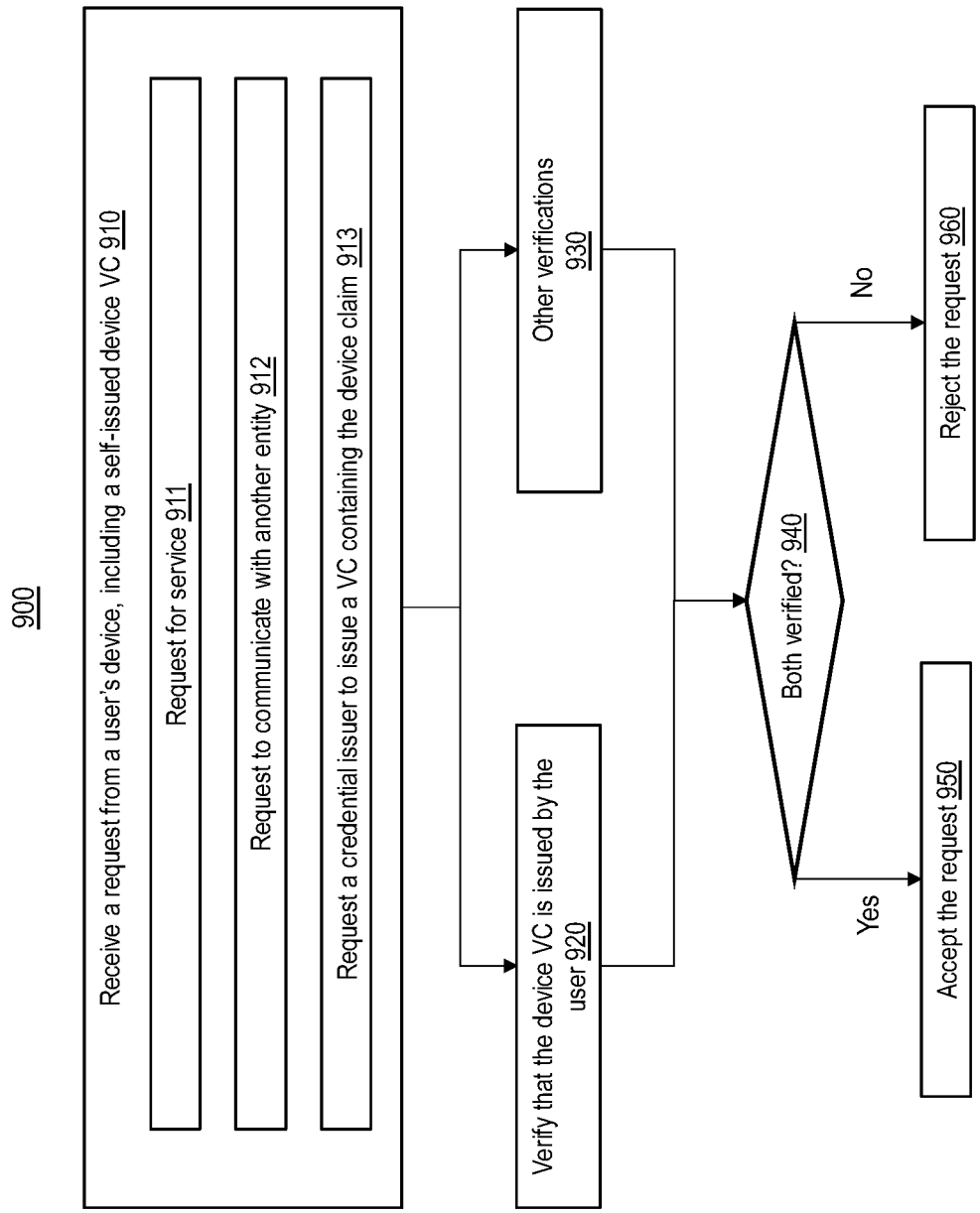
FIG. 9 illustrates a flowchart of an example method for receiving and processing a request from a user's device, including a self-issued VDC.

The following discussion with respect to FIGS. 8-9 now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 8 illustrates a flowchart of an example method 800 for generating and presenting a VDC as part of an identity protection system. The method 800 is likely implemented at a user's computing system. The computing system first retrieves a device identifier of itself (810). For example, the device identifier may be an IMEI number of the device. The computing system then generates a device claim including the device identifier (820). The computing system then generates and attach a proof to the device claim to generate a VC (830). In many cases, the device claim is signed by a private key of a user of the computing system to generate a signature, and the signature is attached to the device claim to generate a VDC (831). In a decentralized environment, when the user is an owner of a DID, the device claim is signed with a private key of the DID (832). A portion of data related to the VDC is then propagated onto a distributed ledger (840). Finally, the VDC is presented to a relying entity as part of an identity protection system (850).

FIG. 9 illustrates a flowchart of an example method 900 for verifying an identity of a user using a self-issued VDC. The method 900 is likely incorporated at a computing system of a relying entity. The relying entity may be another user, a service provider, and/or a credential issuer. The computing system receives a request from a device, including a self-issued VDC (910). In some cases, the request includes a request for service (911). In some cases, the request includes a request to communicate with another entity (912). In some other cases, the request includes a request that requests a credential issuer to issue a VC containing the device claim 913). For example, the credential issuer may be requested to update an existing VC issued to a device user to include the device claim. Alternatively, the credential issuer may be requested to issue a new VC containing the device claim.

Receiving the request and the self-issued VDC, the computing system verifies that the VDC was issued by the user using the proof code contained in the VDC (920). In many cases, additional identification data is also sent to the relying entity at the same time. Thus, other verifications may also be performed (930). For example, a VC issued by a credential issuer and the VDC may be sent to the relying entity substantially simultaneously. The VC and the VDC will both be verified by the computing system. After the device and the user are both verified (940), the computing system then accepts (950) or rejects (960) the request.

Finally, as previously mentioned, the principles described herein may be performed in a decentralized context. As an example, the computing system associated with a credential holder can be a digital wallet, such as the DID management module 1120 described below with respect to FIG. 11. Alternatively, or in addition, the subject of the claims, and the issuer identifier, can be decentralized identifiers (DIDs). Alternatively, or in addition, the portable identity card data structure (or portions thereof) may be stored in a DID document. This would be especially helpful as the portable identity card would then be accessible by the holder from any device associated with the holder's DID. Accordingly, decentralized identifiers will now be described with respect to FIGS. 10 and 11.

Figure 10:
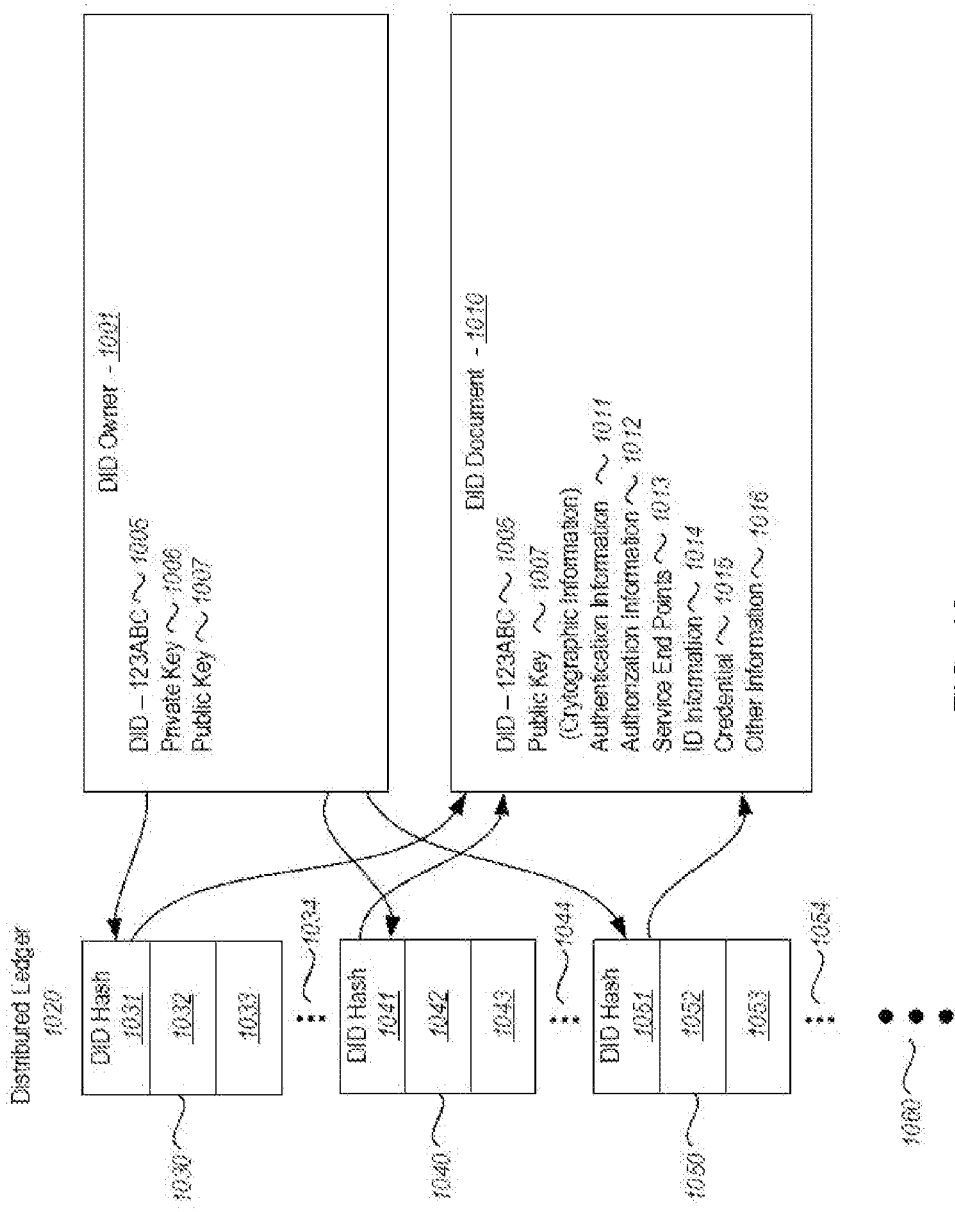
FIG. 10 illustrates an example environment for creating a decentralized identification (DID)

As illustrated in FIG. 10, a DID owner 1001 may own or control a DID 1005 that represents a digital identity of the DID owner 1001. The DID 1005 is a digital identity that correlates with (i.e., identifies) the DID owner 1001 across different digital contexts. The DID owner 1001 may register a DID using a creation and registration service, which will be explained in more detail below.

The DID owner 1001 may be any entity that could benefit from a digital identity. For example, the DID owner 1001 may be a human being or an organization of human beings. Such organizations might include a company, department, government, agency, or any other organization or group of organizations. Each individual human being might have a DID while the organization(s) to which each belongs might likewise have a DID.

The DID owner 1001 may alternatively be a machine, system, or device, or a collection of machine(s), device(s) and/or system(s). In still other embodiments, the DID owner 1001 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 1206 described above with respect to FIG. 12. An example of a complex executable component 1206 might be an artificial intelligence. Accordingly, an artificial intelligence may also own a DID.

Thus, the DID owner 1001 may be any entity, human or non-human, that is capable of creating the DID 1005 or at least having the DID 1005 created for and/or associated with them. Although the DID owner 1001 is shown as having a single DID 1005, this need not be the case as there may be any number of DIDs associated with the DID owner 1001 as circumstances warrant.

As mentioned, the DID owner 1001 may create and register the DID 1005. The DID 1005 may be any identifier that may be associated with the DID owner 1001. Preferably, that identifier is unique to that DID owner 1001, at least within a scope in which the DID is anticipated to be in use. As an example, the identifier may be a locally unique identifier, and perhaps more desirably a globally unique identifier for identity systems anticipated to operate globally. In some embodiments, the DID 1005 may be a Uniform Resource identifier (URI) (such as a Uniform Resource Locator (URL)) or other pointer that relates the DID owner 1001 to mechanisms to engage in trustable interactions with the DID owner 1001.

The DID 1005 is "decentralized" because it does not require a centralized, third party management system for generation, management, or use. Accordingly, the DID 1005 remains under the control of the DID owner 1001. This is different from conventional centralized IDs which base trust on centralized authorities and that remain under control of corporate directory services, certificate authorities, domain name registries, or other centralized authority (referred to collectively as "centralized authorities" herein). Accordingly, the DID 1005 may be any identifier that is under the control of the DID owner 1001 and that is independent of any centralized authority.

In some embodiments, the structure of the DID 1005 may be as simple as a user name or some other human-understandable term. However, in other embodiments, for increased security, the DID 1005 may preferably be a random string of numbers and letters. In one embodiment, the DID 1005 may be a string of 128 numbers and letters. Accordingly, the embodiments disclosed herein are not dependent on any specific implementation of the DID 1005. In a very simple example, the DID 1005 is shown within the figures as "123ABC".

As also shown in FIG. 10, the DID owner 1001 has control of a private key 1006 and public key 1007 pair that is associated with the DID 1005. Because the DID 1005 is independent of any centralized authority, the private key 1006 should at all times be fully in control of the DID owner 1001. That is, the private and public keys should be generated in a decentralized manner that ensures that they remain under the control of the DID owner 1001.

As will be described in more detail to follow, the private key 1006 and public key 1007 pair may be generated on a device controlled by the DID owner 1001. The private key 1006 and public key 1007 pair should not be generated on a server controlled by any centralized authority as this may cause the private key 1006 and public key 1007 pair to not be fully under the control of the DID owner 1001 at all times. Although FIG. 10 and this description have described a private and public key pair, it will also be noted that other types of reasonable cryptographic information and/or mechanisms may also be used as circumstances warrant.

FIG. 10 also illustrates a DID document 1010 that is associated with the DID 1005. As will be explained in more detail to follow, the DID document 1010 may be generated at the time that the DID 1005 is created. In its simplest form, the DID document 1010 describes how to use the DID 1005. Accordingly, the DID document 1010 includes a reference to the DID 1005, which is the DID that is described by the DID document 1010. In some embodiments, the DID document 1010 may be implemented according to methods specified by a distributed ledger 1020 (such as blockchain) that will be used to store a representation of the DID 1005 as will be explained in more detail to follow. Thus, the DID document 1010 may have different methods depending on the specific distributed ledger.

The DID document 1010 also includes the public key 1007 created by the DID owner 1001 or some other equivalent cryptographic information. The public key 1007 may be used by third party entities that are given permission by the DID owner 1001 to access information and data owned by the DID owner 1001. The public key 1007 may also be used to verify that the DID owner 1001 in fact owns or controls the DID 1005.

The DID document 1010 may also include authentication information 1011. The authentication information 1011 specifies one or more mechanisms by which the DID owner 1001 is able to prove that the DID owner 1001 owns the DID 1005. In other words, the mechanisms of the authentication information 1011 shows proof of a binding between the DID 1005 (and thus its DID owner 1001) and the DID document 1010. In one embodiment, the authentication information 1011 specifies that the public key 1007 be used in a signature operation to prove the ownership of the DID 1005. Alternatively, or in addition, the authentication information 1011 specifies that the public key 1007 be used in a biometric operation to prove ownership of the DID 1005. Accordingly, the authentication information 1011 includes any number of mechanisms by which the DID owner 1001 is able to prove that the DID owner 1001 owns the DID 1005.

The DID document 1010 may also include authorization information 1012. The authorization information 1012 allows the DID owner 1001 to authorize third party entities the rights to modify the DID document 1010 or some part of the document without giving the third party the right to prove ownership of the DID 1005. In one example, the authorization information 1012 allows the third party to update any designated set of one or more fields in the DID document 1010 using any designated update mechanism. Alternatively, the authorization information allows the third party to limit the usages of DID 1005 by the DID owner 1001 for a specified time period. This may be useful when the DID owner 1001 is a minor child and the third party is a parent or guardian of the child. The authorization information 1012 may allow the parent or guardian to limit use of the DID owner 1001 until such time as the child is no longer a minor.

The authorization information 1012 also specifies one or more mechanisms that the third party will need to follow to prove they are authorized to modify the DID document 1010. In some embodiments, these mechanisms may be similar to those discussed previously with respect to the authentication information 1011.

The DID document 1010 also includes one or more service endpoints 1013. A service endpoint includes a network address at which a service operates on behalf of the DID owner 1001. Examples of specific services include discovery services, social networks, file storage services such as identity servers or hubs, and verifiable claim repository services. Accordingly, the service endpoints 1013 operate as pointers for the services that operate on behalf of the DID owner 1001. These pointers may be used by the DID owner 1001 or by third party entities to access the services that operate on behalf of the DID owner 1001. Specific examples of service endpoints 1013 will be explained in more detail to follow.

The DID document 1010 further includes identification information 1014. The identification information 1014 includes personally identifiable information such as the name, address, occupation, family members, age, hobbies, interests, or the like of DID owner 1001. Accordingly, the identification information 1014 listed in the DID document 1010 represents a different persona of the DID owner 1001 for different purposes.

A persona may be pseudo anonymous. As an example, the DID owner 1001 may include a pen name in the DID document when identifying him or her as a writer posting articles on a blog. A persona may be fully anonymous. As an example, the DID owner 1001 may only want to disclose his or her job title or other background data (e.g., a school teacher, an FBI agent, an adult older than 21 years old, etc.) but not his or her name in the DID document. As yet another example, a persona may be specific to who the DID owner 1001 is as an individual. As an example, the DID owner 1001 may include information identifying him or her as a volunteer for a particular charity organization, an employee of a particular corporation, an award winner of a particular award, and so forth.

The DID document 1010 also includes credential information 1015, which may also be referred to herein as an attestation. The credential information 1015 may be any information that is associated with the DID owner 1001's background. For instance, the credential information 1015 may be (but is not limited to) a qualification, an achievement, a government ID, a government right such as a passport or a driver's license, a payment provider or bank account, a university degree or other educational history, employment status and history, or any other information about the DID owner 1001's background.

The DID document 1010 also includes various other information 1016. In some embodiments, the other information 1016 may include metadata specifying when the DID document 1010 was created and/or when it was last modified. In other embodiments, the other information 1016 may include cryptographic proofs of the integrity of the DID document 1010. In still further embodiments, the other information 1016 may include additional information that is either specified by the specific method implementing the DID document or desired by the DID owner 1001.

FIG. 10 also illustrates a distributed ledger 1020. The distributed ledger 1020 can be any decentralized, distributed network that includes various computing systems that are in communication with each other. In one example, the distributed ledger 1020 includes a first distributed computing system 1030, a second distributed computing system 1040, a third distributed computing system 1050, and any number of additional distributed computing systems as represented by the ellipses 1060. The distributed ledger 1020 operates according to any known standards or methods for distributed ledgers. Examples of conventional distributed ledgers that correspond to the distributed ledger 1020 include, but are not limited to, Bitcoin [BTC], Ethereum, and Litecoin.

In the context of DID 1005, the distributed ledger or blockchain 1020 is used to store a representation of the DID 1005 that points to the DID document 1010. In some embodiments, the DID document 1010 may be stored on the actual distributed ledger. Alternatively, in other embodiments the DID document 1010 may be stored in a data storage (not illustrated) that is associated with the distributed ledger 1020.

A representation of the DID 1005 is stored on each distributed computing system of the distributed ledger 1020. For example, in FIG. 10 this is shown as DID hash 1031, DID hash 1041, and DID hash 1051, which are ideally identical hashed copies of the same DID. The DID hash 1031, DID hash 1041, and DID hash 1051 point to the location of the DID document 1010. The distributed ledger or blockchain 1020 may also store numerous other representations of other DIDs as illustrated by references 1032, 1033, 1034, 1042, 1043, 1044, 1052, 1053, and 1054.

In one embodiment, when the DID owner 1001 creates the DID 1005 and the associated DID document 1010, the DID hash 1031, DID hash 1041, and DID hash 1051 are written to the distributed ledger 1020. The distributed ledger 1020 thus records that the DID 1005 now exists. Since the distributed ledger 1020 is decentralized, the DID 1005 is not under the control of any entity outside of the DID owner 1001. DID hash 1031, DID hash 1041, and DID hash 1051 may each include, in addition to the pointer to the DID document 1010, a record or time stamp that specifies when the DID 1005 was created. At a later date, when modifications are made to the DID document 1010, each modification (and potentially also a timestamp of the modification) is also be recorded in DID hash 1031, DID hash 1041, and DID hash 1051. DID hash 1031, DID hash 1041, and DID hash 1051 could further include a copy of the public key 1007 so that the DID 1005 is cryptographically bound to the DID document 1010.

Figure 11:
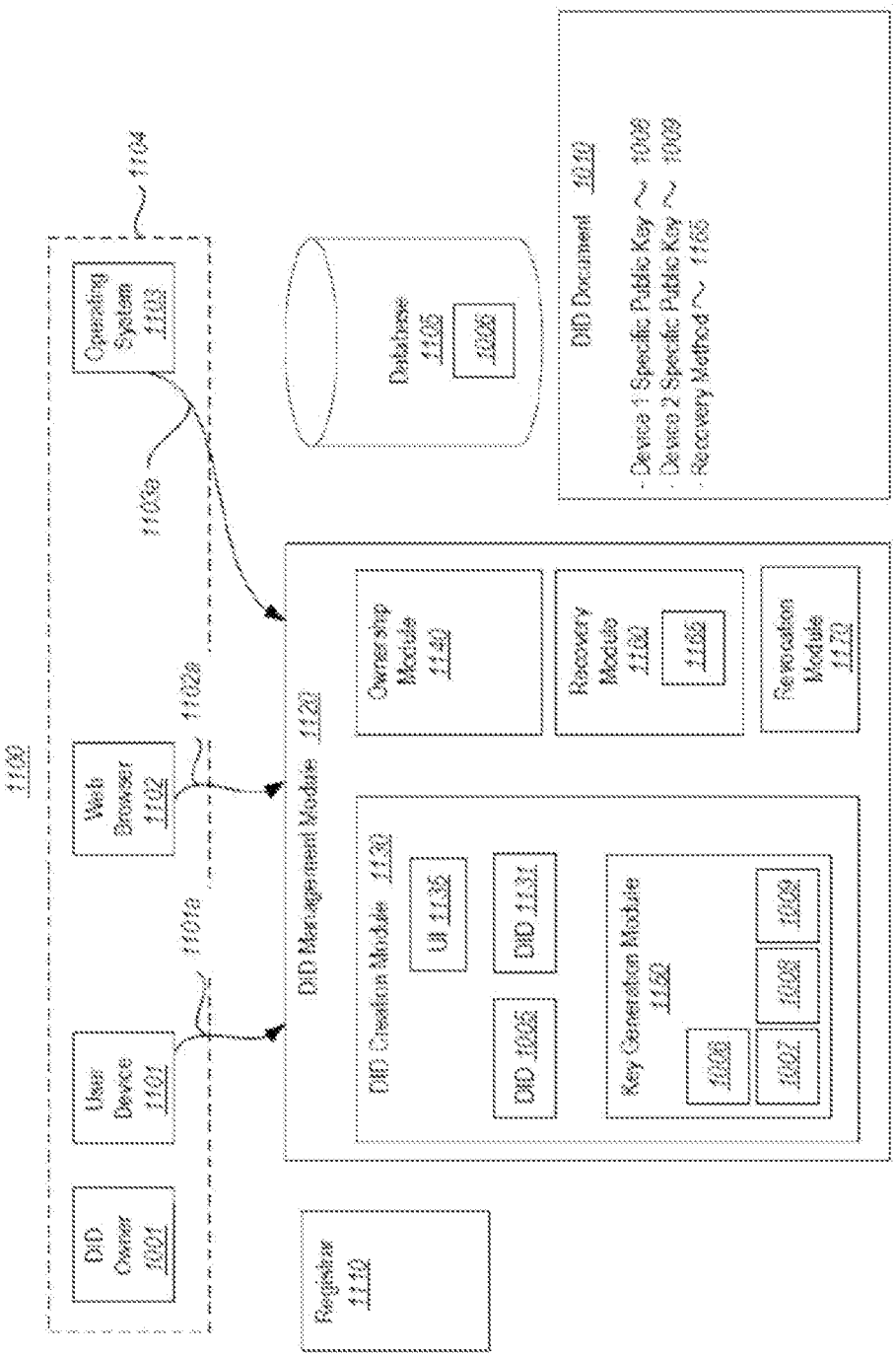
FIG. 11 illustrates an example environment for various DID management operations and services.

Having described DIDs and how they operate generally with reference to FIG. 10, specific embodiments of DID environments will now be explained with respect to FIG. 11. FIG. 11 illustrates an example environment 1100 that may be used to perform various DID management operations and services will now be explained. It will be appreciated that the environment of FIG. 11 may reference elements from FIG. 10 as needed for ease of explanation.

As shown in FIG. 11, the environment 1100 includes various devices and computing systems that are owned or otherwise under the control of the DID owner 1001. These may include a user device 1101. The user device 1101 may be, but is not limited to, a mobile device such as a smart phone, a computing device such as a laptop computer, or any device such as a car or an appliance that includes computing abilities. The device 1101 includes a web browser 1102 operating on the device and an operating system 1103 operating the device. More broadly speaking, the dashed line 1104 represents that all of these devices may be owned by or may otherwise be under the control of the DID owner 1001.

The environment 1100 also includes a DID management module 1120. In operation, as represented by respective arrows 1101a, 1102a and 1103a, the DID management module 1120 resides on and is executed by one or more of user device 1101, web browser 1102, and the operating system 1103. Accordingly, the DID management module 1120 is shown as being separate for ease of explanation. The DID management module 1120 may be also described as a "wallet" in that it can hold various claims made by or about a particular DID. In one example, the DID management module 1120 is structured as described above for the executable component 1206.

As shown in FIG. 11, the DID management module 1120 includes a DID creation module 1130. The DID creation module 1130 may be used by the DID owner 1001 to create the DID 1005 or any number of additional DIDs, such as DID 1131. In one embodiment, the DID creation module may include or otherwise have access to a User Interface (UI) element 1135 that may guide the DID owner 1001 in creating the DID 1005. The DID creation module 1130 has one or more drivers that are configured to work with specific distributed ledgers such as distributed ledger 1020 so that the DID 1005 complies with the underlying methods of that distributed ledger.

A specific embodiment will now be described. For example, the UI 1135 may provide a prompt for the user to enter a user name or some other human recognizable name. This name may be used as a display name for the DID 1005 that will be generated. As previously described, the DID 1005 may be a long string of random numbers and letters and so having a human-recognizable name for a display name may be advantageous. The DID creation module 1130 may then generate the DID 1005. In the embodiments having the UI 1135, the DID 1005 may be shown in a listing of identities and may be associated with the human-recognizable name.

The DID creation module 1130 may also include a key generation module 1150. The key generation module may generate the private key 1006 and public key 1007 pair previously described. The DID creation module 1130 may then use the DID 1005 and the private and public key pair to generate the DID document 1010.

In operation, the DID creation module 1130 accesses a registrar 1110 that is configured to the specific distributed ledger that will be recording the transactions related to the DID 1005. The DID creation module 1130 uses the registrar 1110 to record DID hash 1031, DID hash 1041, and DID hash 1051 in the distributed ledger in the manner previously described, and to store the DID document 1010 in the manner previously described. This process may use the public key 1007 in the hash generation.

In some embodiments, the DID management module 1120 may include an ownership module 1140. The ownership module 1140 may provide mechanisms that ensure that the DID owner 1001 is in sole control of the DID 1005. In this way, the provider of the DID management module 1120 is able to ensure that the provider does not control the DID 1005, but is only providing the management services.

The key generation module 1150 generates the private key 1006 and public key 1007 pair and the public key 1007 is then recorded in the DID document 1010. Accordingly, the public key 1007 may be used by all devices associated with the DID owner 1001 and all third parties that desire to provide services to the DID owner 1001. Accordingly, when the DID owner 1001 desires to associate a new device with the DID 1005, the DID owner 1001 may execute the DID creation module 1130 on the new device. The DID creation module 1130 may then use the registrar 1110 to update the DID document 1010 to reflect that the new device is now associated with the DID 1005, which update would be reflected in a transaction on the distributed ledger 1020.

In some embodiments, however, it may be advantageous to have a public key per device 1101 owned by the DID owner 1001 as this may allow the DID owner 1001 to sign with the device-specific public key without having to access a general public key. In other words, since the DID owner 1001 will use different devices at different times (for example using a mobile phone in one instance and then using a laptop computer in another instance), it is advantageous to have a key associated with each device to provide efficiencies in signing using the keys. Accordingly, in such embodiments, the key generation module 1150 generates additional public keys 1008 and 1009 when the additional devices execute the DID creation module 1130. These additional public keys may be associated with the private key 1006 or in some instances may be paired with a new private key.

In those embodiments where the additional public keys 1008 and 1009 are associated with different devices, the additional public keys 1008 and 1009 are recorded in the DID document 1010 as being associated with those devices, as shown in FIG. 11. The DID document 1010 may include the information (information 1005, 1007 and 1011 through 1016) previously described in relation to FIG. 10 in addition to the information (information 1008, 1009 and 1165) shown in FIG. 11. If the DID document 1010 existed prior to the device-specific public keys being generated, then the DID document 1010 would be updated by the creation module 1130 via the registrar 1110 and this would be reflected in an updated transaction on the distributed ledger 1020.

In some embodiments, the DID owner 1001 may desire to keep secret the association of a device with a public key or the association of a device with the DID 1005. Accordingly, the DID creation module 1130 may cause that such data be secretly shown in the DID document 1010.

As described thus far, the DID 1005 has been associated with all the devices under the control of the DID owner 1001, even when the devices have their own public keys. However, in some embodiments, each device or some subset of devices under the control of the DID owner 1001 may each have their own DID. Thus, in some embodiments the DID creation module 1130 may generate an additional DID, for example DID 1131, for each device. The DID creation module 1130 would then generate private and public key pairs and DID documents for each of the devices and have them recorded on the distributed ledger 1020 in the manner previously described. Such embodiments may be advantageous for devices that may change ownership as it may be possible to associate the device-specific DID to the new owner of the device by granting the new owner authorization rights in the DID document and revoking such rights from the old owner.

As mentioned, to ensure that the private key 1006 is totally in the control of the DID owner 1001, the private key 1006 is created on the user device 1101, browser 1102, or operating system 1103 that is owned or controlled by the DID owner 1001 that executed the DID management module 1120. In this way, there is little chance that a third party (and most consequentially, the provider of the DID management module 1120) will gain control of the private key 1006.

However, there is a chance that the device storing the private key 1006 may be lost by the DID owner 1001, which may cause the DID owner 1001 to lose access to the DID 1005. Accordingly, in some embodiments, the UI 1135 includes the option to allow the DID owner 1001 to export the private key 1006 to an off device secured database 1105 that is under the control of the DID owner 1001. As an example, the database 1105 may be one of the identity hubs 1210 described below with respect to FIG. 12. A storage module 1180 is configured to store data (such as the private key 1006 or attestations made by or about the DID owner 1001) off device in the database 1105 or identity hubs 1210. In some embodiments, the private key 1006 is stored as a QR code that is scanned by the DID owner 1001.

In other embodiments, the DID management module 1120 may include a recovery module 1160 that may be used to recover a lost private key 1006. In operation, the recovery module 1160 allows the DID owner 1001 to select one or more recovery mechanisms 1165 at the time the DID 1005 is created that may later be used to recover the lost private key. In those embodiments having the UI 1135, the UI 1135 may allow the DID owner 1001 to provide information that will be used by the one or more recovery mechanisms 1165 during recovery. The recovery module 1160 may then be run on any device associated with the DID 1005.

The DID management module 1120 may also include a revocation module 1170 that is used to revoke or sever a device from the DID 1005. In operation, the revocation module uses the UI element 1135, which allows the DID owner 1001 to indicate a desire to remove a device from being associated with the DID 1005. In one embodiment, the revocation module 1170 accesses the DID document 1010 and causes that all references to the device be removed from the DID document 1010. Alternatively, the public key for the device may be removed, and this change is then reflected in the DID document 1010 may then be reflected as an updated transaction on the distributed ledger 1020.

Because the principles described herein are performed in the context of a computing system, some introductory discussion of a computing system will be described with respect to FIG. 12. Then, this description will return to the principles of a decentralized identifier (DID) platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 12, in its most basic configuration, a computing system 1200 includes at least one hardware processing unit 1202 and memory 1204. The processing unit 1202 includes a general-purpose processor. Although not required, the processing unit 1202 may also include a field programmable gate array (FPGA), an application specific integrated circuit (ASIC), or any other specialized circuit. In one embodiment, the memory 1204 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 1200 also has thereon multiple structures often referred to as an "executable component". For instance, the memory 1204 of the computing system 1200 is illustrated as including executable component 1206. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 1204 of the computing system 1200. Computing system 1200 may also contain communication channels 1208 that allow the computing system 1200 to communicate with other computing systems over, for example, network 1210.

While not all computing systems require a user interface, in some embodiments, the computing system 1200 includes a user interface system 1212 for use in interfacing with a user. The user interface system 1212 may include output mechanisms 1212A as well as input mechanisms 1212B. The principles described herein are not limited to the precise output mechanisms 1212A or input mechanisms 1212B as such will depend on the nature of the device. However, output mechanisms 1212A might include, for instance, speakers, displays, tactile output, virtual or augmented reality, holograms and so forth. Examples of input mechanisms 1212B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having thereon computer-executable instructions that are structured such that, when executed by the one or more processors, cause the computing system to perform the following:
   retrieve a value of a device identifier of the computing system;
   generate a device claim asserting the value of the device identifier;
   associate the device claim with an identifier of a user of the computing system;
   generate and attach proof code to the device claim to generate a verifiable device credential (VDC), the proof code proving that the VDC is issued by the computing system that is associated with the user; and
   present the VDC with additional user information to a second computing system as part of an identity protection system, wherein the second computing system is associated with a relying entity or a credential issuer and when the second computing system receives the VDC, the second computing system is caused to use the proof code to verify whether the VDC was issued by a computing system associated with the user and to analyze the user information with the device identifier to determine whether the device is an authorized device of the user based on previous communication or transaction records.

2. The computing system of claim 1, wherein the proof code includes a cryptographic signature signed by a private key of the user:
   the user is an owner of a decentralized identifier (DID);
   the device claim is associated with the DID;
   the cryptographic signature is signed by a private key of the DID; and
   a portion of data associated with the VDC is propagated onto a DID document or a distributed ledger.

3. The computing system of claim 2, wherein the VDC includes metadata indicating one or more revocation mechanism(s) for revoking the VDC.

4. The computing system of claim 2, wherein the one or more revocation mechanism(s) include an expiration time, such that when the expiration time reaches, the VDC is automatically revoked.

5. The computing system of claim 1, wherein the additional user information includes at least one of the following: (1) a self-issued VC issued by the user containing additional user information; or (2) a VC issued to the user by a credential issuer.

6. The computing system of claim 1, wherein:
the computing system associated with the user is a credential holder;
in response to receiving the VDC from the computing system, the computing system associated with the credential issuer is caused to:
verify that the VDC was issued by the user,
in response to the verification, issue or reissue a user VC containing the device claim, and
send the user VC containing the device claim back to the computing system.

7. The computing system of claim 6, wherein:
the credential issuer is an owner of a DID;
the user VC is signed by a private key of the DID of the credential issuer; and
a portion of data related to the user VC is propagated on to a distributed ledger.

8. The computing system of claim 6, the computing system further caused to:
receive the user VC containing the device claim from the credential issuer; and
present both the VDC and the user VC containing the device claim to a third computing system associated with second relying entity.

9. The computing system of claim 8, wherein:
when the computing system associated with the second relying entity receives the VDC and the user VC containing the device claim, the computing system of the second relying entity is caused to:
extract the device identifier contained in the VDC and the device identifier contained in the user VC;
compare the extracted device identifiers to determine whether the extracted device identifiers match;
in response to a determination of match, determine that the computing system is an authorized device for presenting the user VC; and
send the determination to the computing system; and
the computing system receives the determination from the third computing system associated with the second relying entity.

10. The computing system of claim 6, wherein:
the computing system is further caused to request the credential issuer to update a user claim contained in the user VC; and
when the credential issuer receives the request, the credential issuer is caused to:
extract the device identifier contained in the VDC and the device identifier contained in the user VC;
compare the extracted device identifiers to determine whether the extracted device identifiers match;
in response to a determination of match, update the user claim contained in the user VC; and
in response to a determination of no match, reject the request.

11. The computing system of claim 1, the computing system further caused to:
create a data structure of a portable identity card;
insert the VDC in the data structure of the portable identity card;
present the data structure of the personal identity card as one or more visualization(s), at least one of the visualization(s) resembling a physical identity card; and
record data related to usage of the VDC during communications between the computing system and one or more relying entities as metadata of the portable identity card.

12. The computing system of claim 11, wherein:
at least one of visualization(s) is configured to receive a user input instructing the device to perform at least one of the following: (1) present the VDC to the second computing system or the third computing system; (2) revoke the VDC; or (3) renew or reissue the VDC.

13. A method implemented at a computing system for generating and presenting a verifiable device credential (VDC) as part of an identity protection system, the method comprising:
retrieving a value of a device identifier of the computing system;
generating a device claim asserting the value of the device identifier;
associating the device claim with an identifier of a user of the computing system;
generating and attach proof code to the device claim to generate a verifiable device credential (VDC), the proof code proving that the VDC is issued by the user of the computing system; and
presenting the VDC with additional user information to a second computing system associated with a relying entity as part of an identity protection system, wherein the second computing system is associated with a relying entity or a credential issuer and when the second computing system receives the VDC, the second computing system is caused to use the proof code to verify whether the VDC was issued by a computing system associated with the user and to analyze the user information with the device identifier to determine whether the device is an authorized device of the user based on previous communication or transaction records.

14. The method of claim 13, wherein the proof code includes a cryptographic signature signed by a private key of the user:
the user is an owner of a decentralized identifier (DID);
the device claim is associated with the DID;
the cryptographic signature is signed by a private key of the DID; and
a portion of data associated with the VDC is propagated onto a DID document or a distributed ledger.

15. The method of claim 13, wherein the VDC includes metadata indicating one or more revocation mechanism(s) for revoking the VDC.

16. The method of claim 13, wherein the one or more revocation mechanism(s) include an expiration time, such that when the expiration time reaches, the VDC is automatically revoked.

17. The method of claim 13, wherein the additional user information includes at least one of the following: (1) a self-issued VC issued by the user containing additional user information; or (2) a VC issued to the user by a credential issuer.

18. The method of claim 13, wherein:
the computing system associated with the user is a credential holder;
in response to receiving the VDC from the computing system, the method further comprising:
verifying that the VDC was issued by the user,
in response to the verification, issuing or reissuing a user VC containing the device claim, and
sending the user VC containing the device claim back to the computing system.

19. The method of claim 13, further comprising:
creating a data structure of a portable identity card;
inserting the VDC in the data structure of the portable identity card;
presenting the data structure of the personal identity card as one or more visualization(s), at least one of the visualization(s) resembling a physical identity card; and
recording data related to usage of the VDC during communications between the computing system and one or more relying entities as metadata of the portable identity card.

20. A computer program product comprising one or more computer-readable hardware storage devices having thereon computer-executable instructions that are executable by one or more processors of a computing system for configuring the computing system to generate and present a verifiable device credential (VDC) as part of an identity protection system by at least configuring the computing system to perform the following:
retrieve a value of a device identifier of the computing system;
generate a device claim asserting the value of the device identifier;
associate the device claim with an identifier of a user of the computing system;
generate and attach proof code to the device claim to generate a verifiable device credential (VDC), the proof code proving that the VDC is issued by the computing system that is associated with the user; and
present the VDC with additional user information to a second computing system as part of an identity protection system, wherein the second computing system is associated with a relying entity or a credential issuer and when the second computing system receives the VDC, the second computing system is caused to use the proof code to verify whether the VDC was issued by a computing system associated with the user and to analyze the user information with the device identifier to determine whether the device is an authorized device of the user based on previous communication or transaction records.

* * * * *